US006337792B1

(12) United States Patent
George

(10) Patent No.: US 6,337,792 B1
(45) Date of Patent: Jan. 8, 2002

(54) OUTDOOR LUMINAIRE AND METHOD REPLACING ELECTRICAL COMPONENTS THEREOF

(76) Inventor: Mark San George, 7373 Worthington Rd., Westerville, OH (US) 43082-9102

( * ) Notice: Subject to any disclaimer, the term of this patent is extended or adjusted under 35 U.S.C. 154(b) by 0 days.

(21) Appl. No.: 09/460,549

(22) Filed: Dec. 13, 1999

(51) Int. Cl.[7] .................................................. H02B 1/00

(52) U.S. Cl. ...................... 361/674; 361/679; 174/52.2; 362/267; 362/310; 362/375

(58) Field of Search ................................ 361/331, 339, 361/380, 392, 417, 625–642, 669–675; 174/50.52, 50.56, 50.55, 522; 336/96; 439/712, 722, 736; 248/507, 510; 362/96, 153.1, 267, 226, 370, 371, 396, 431, 263, 362, 414, 410, 457, 432, 265, 285–287, 276, 102, 307, 374, 375, 43.1, 802

(56) References Cited

U.S. PATENT DOCUMENTS 3,071,683 A 1/1963 Queale
3,317,724 A 5/1967 Pfaff, Jr. et al.
3,560,731 A * 2/1971 Burton ...................... 240/11.2
3,610,942 A * 10/1971 Arens ......................... 250/230
3,705,302 A * 12/1972 Judge et al. ............ 240/78 LH
3,761,781 A * 9/1973 Dean ........................ 174/52 R
3,784,806 A 1/1974 Kenyon et al.
4,388,680 A * 6/1983 Moore ........................ 362/368
4,719,540 A * 1/1988 George et al. .............. 361/377
4,719,548 A * 1/1988 Orosz ......................... 362/309
4,791,539 A * 12/1988 Ewing ........................ 362/362
4,796,001 A * 1/1989 Gostyla ....................... 338/20
4,937,718 A * 6/1990 Murray ....................... 362/431
5,136,493 A * 8/1992 Straus et al. ................ 362/373
5,243,508 A * 9/1993 Ewing et al. ............... 362/431
5,276,583 A * 1/1994 Tyson ......................... 361/679
5,351,174 A * 9/1994 Ewing ........................ 362/226
5,803,590 A * 9/1998 Wedell et al. .............. 362/226
6,059,427 A * 5/2000 Wedell et al. .............. 362/267

FOREIGN PATENT DOCUMENTS

CA 984359 2/1976

* cited by examiner

*Primary Examiner*—Leo P. Picard
*Assistant Examiner*—Michael Datskovsky

(57) ABSTRACT

A new and improved outdoor luminaire and a method which provides for quick and easy installation of electrical components. The outdoor luminaire includes a housing; a terminal block; a unitized electrical components subassembly which is removably affixable to the housing; a seat area formed in the housing's interior; a stud affixed to the unitized components subassembly; and a cover for the housing. The cover requires no fasteners and thus, further eases the installation or replacement of electrical components. The method of securing electrical components includes: opening the housing's cover at the pry point; inserting the lower end of the electrical components subassembly in the housing; pivoting the top end of the electrical components subassembly into the housing; rotating the quarter turn fastener to secure the electrical components subassembly in the housing and snapping the cover onto the housing.

8 Claims, 5 Drawing Sheets

OUTDOOR LUMINAIRE AND METHOD REPLACING ELECTRICAL COMPONENTS THEREOF

TECHNICAL FIELD

The present invention is directed to an improved housing unit and electrical component subassembly configuration to facilitate replacement thereof in an outdoor luminaire and to the method of such replacement.

BACKGROUND ART

In an outdoor environment, access to the electrical components for lighting is limited and, often, replacement of electrical components is difficult due to weather conditions. Further, electrical components for outdoor lighting may experience problems due to the outdoor environment and require immediate correction.

Luminaire assembly designs in the prior art include a housing for enclosing and protecting electrical components required for operation of the luminaire and an optical assembly. The optical assembly is generally comprised of a lighting unit and a refractor for producing and directing light of various intensities. These prior art designs often utilize electrical assemblies that are wired directly to the lighting unit through the use of a plurality of wires, splicing means, and/or permanent connecting means.

Direct wired electrical assemblies of the type referenced above have heretofore been used to ensure proper electrical contact between system components. Those skilled in the art will recognize, however, that such prior art designs have resulted in increased installation and maintenance time and cost because the minimal flexibility afforded by the mechanical design. These maintenance procedures often include the disassembly of sometimes heavy and awkward parts as well as the removal, splicing and reconnection of electrical wires. Because of the direct wired design of the prior art systems, these maintenance proedures must also be performed on-site or, in the alternative, the luminaire must be temporarily disabled while the particular component is repaired in the laboratory or factory. These time consuming and labor intensive maintenance procedures must be performed on-site and on a regular basis.

It is appreciated by those skilled in the art that the maintenance procedures referenced above are, of course, further hindered during adverse weather conditions, including heavy winds, rain and snow as well as extreme temperature gradients. The maintenance complications inherent in the prior art luminaire assembly designs have resulted in increased labor and maintenance costs which, in turn have caused purchasers and luminaire designers to turn their attention toward viable design alternatives.

Recent inventions have attempted to address the need to provide for quick and easy installation of electrical components. For example, instead of individually mounting small components such as starters, ballasts and capacitors to a lighting unit, it may be possible to instead attach them to a base or platform. This platform would then comprise a subassembly which is then mounted to the lighting unit. Modified or new electrical components may then be incorporated into the platform. The platform can be modified to accept new components inexpensively and quickly without affecting any other part of the luminaire.

U.S. Pat. No. 4,791,539 issued to Ewing on Dec. 13, 1998 discloses prior art luminaire designs of the type referenced above. The Ewing patent discloses a mounting arrangement for electrical components in a luminaire where the electrical components are mounted on an electric plate which is detachably secured to a support plate with quick disconnect means being provided for detaching said electrical plate from said support plate. Similarly, Canadian Patent No. 984,359 issued to Wese on Feb. 24, 1976 discloses tracks disposed in the housing of an outdoor luminaire where the tracks permit the ballast to be properly seated within the housing. Although the maintenance and time for replacing electrical components is reduced with the inventions disclosed in the '539 and '359 patents, these inventions require a user to have tools to affix the electrical component subassembly to the fixture and/or to open and close the housing unit. Particularly with pole top lighting fixtures, it is difficult for a user to access electrical components while also handling other tools. Consequently, a need exists to quickly and easily access and replace electrical components without the use of tools.

DISCLOSURE OF INVENTION

Accordingly, it is an object of this invention to provide improved installation of luminaire components.

It is also an object and advantage of this invention to provide improved access to the components inside the housing.

It is an object and advantage of this invention to provide for improved time efficient replacement of internal components.

It is yet another object of the invention to provide an improved method for quickly and easily removing and replacing the unitized electrical subassembly without having to disassemble the entire luminaire.

A more specific object of this invention is to provide an outdoor luminaire which includes a base or housing having a hollow interior, a cover and an electrical component subassembly. The hollow interior of the base or housing is integrally configured to define an access opening, a seat, a fastener keeper and a cover retainer. The cover interfits with the housing's cover retainer to close the access opening. The cover is releaseable from the interfit to open the access opening. The electrical component subassembly includes electrical components such as a ballast, capacitor, photo control, and photo control receptacle in addition to a mounting plate and a quarter-turn fastener. The mounting plate of the electrical component subassembly unitizes the electrical components and the quarter turn fastener. The mounting plate of the electrical component subassembly cooperates with the seat of the housing to tiltably position the electrical component subassembly in the hollow interior of the base/housing so that the quarter turn fastener aligns with the fastener keeper.

The housing unit of the present invention provides a design for quick and easy installation of the electrical components of a luminaire without the use of tools. The design also provides for efficient access to electrical components inside the housing. Accordingly, replacement of internal components is quick and easy. This design allows a user to change wattage or voltage without replacing entire luminaire or substantial disassembly and without using tools. This is accomplished by providing an entry to housing which consists of single die cast access cover fitting onto housing and by using a unitized electrical component subassembly. The electrical components are affixed to a mounting plate which in turn is secured to the housing via a quarter turn fastener. The single die cast access cover does not use fasteners. Cover is removed by merely prying the cover open at the prypoint and the cover is locked into place by merely inserting cover onto housing.

The housing unit of the present invention consists of a die cast base. The interior of the housing includes a seat area on top of pole fitter hub for securing electrical subassembly. At the underside of the socket casting is located quarter turn stud receptacle or a fastener keeper that accepts quarter turn stud which is mounted on unitized electrical component subassembly. Seat area and quarter turn stud affix unitized electrical component subassembly to housing. Ignitor sits in recess in front of unitized electrical subassembly and is connected to the unitized electrical component subassembly by harness. Harness supplies line voltage and lamp voltage. Harness is connected to terminal block and engages connector on electrical subassembly by supplying power to various components and returning excitation power to luminaire.

With respect to unitized electrical subassembly, subassembly may be pivoted out for removal. Removal is accomplished by unplugging harness and then unlocking quarter turn fastener on unitized electrical component subassembly. By tilting the top out, subassembly can be completely removed. Installation of unitized electrical component subassembly may be performed by inserting the bottom end of the subassembly into base/housing having the top end tilted out. The bottom of the subassembly is then slid along rails that slope down to seat area. Right and left side rails are formed into housing in which the sides of the subassembly are positioned within. Upon contacting backstop, subassembly is pivoted up and quarter turn fastener is turned to secure the subassembly within the housing. Harness is then reconnected to connector on subassembly. The housing is then enclosed by merely snapping the cover into place.

These and other objects, features and advantages of the invention are readily apparent from the following detailed descriptions of the best modes for carrying out the invention when taken in conjunction with the accompanying drawings.

BEST MODES FOR CARRYING OUT THE INVENTION

Figure 1:
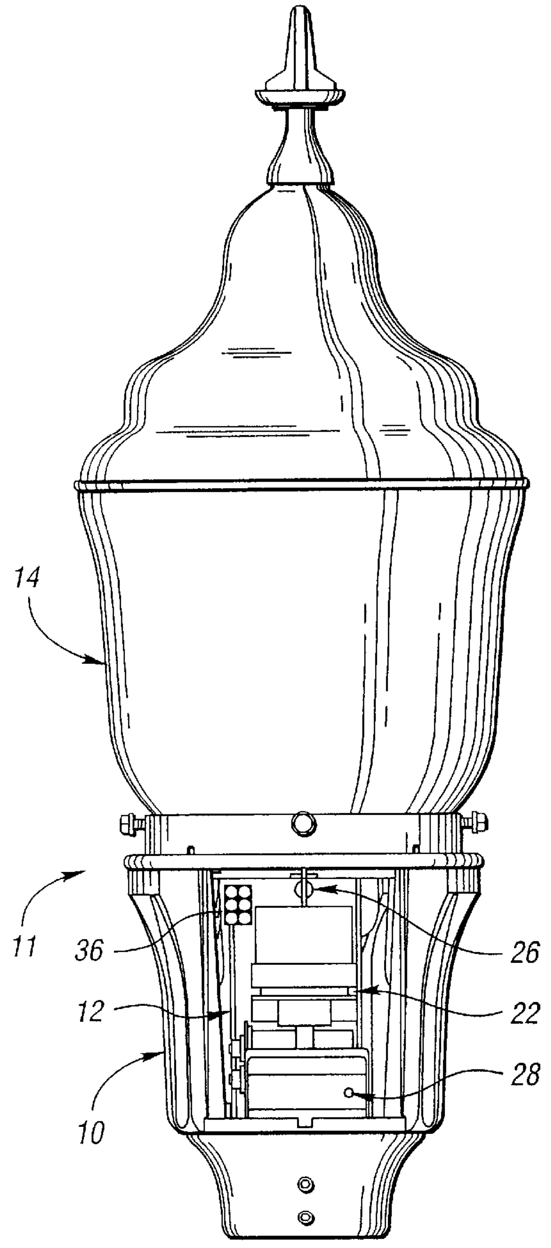
FIG. 1 is a front elevational view of an ornamental street/walkway luminaire in accordance with this invention shown with a die cast access cover removed revealing the electrical component subassembly.

With reference to the drawings, the preferred embodiment of the invention will be described. FIG. 1 shows a luminaire 46 with die cast access cover 16 (not shown) removed. The components comprising the invention consist a housing 10 having a hollow interior, a cover 16 and an electrical component subassembly 22.

Figure 2:
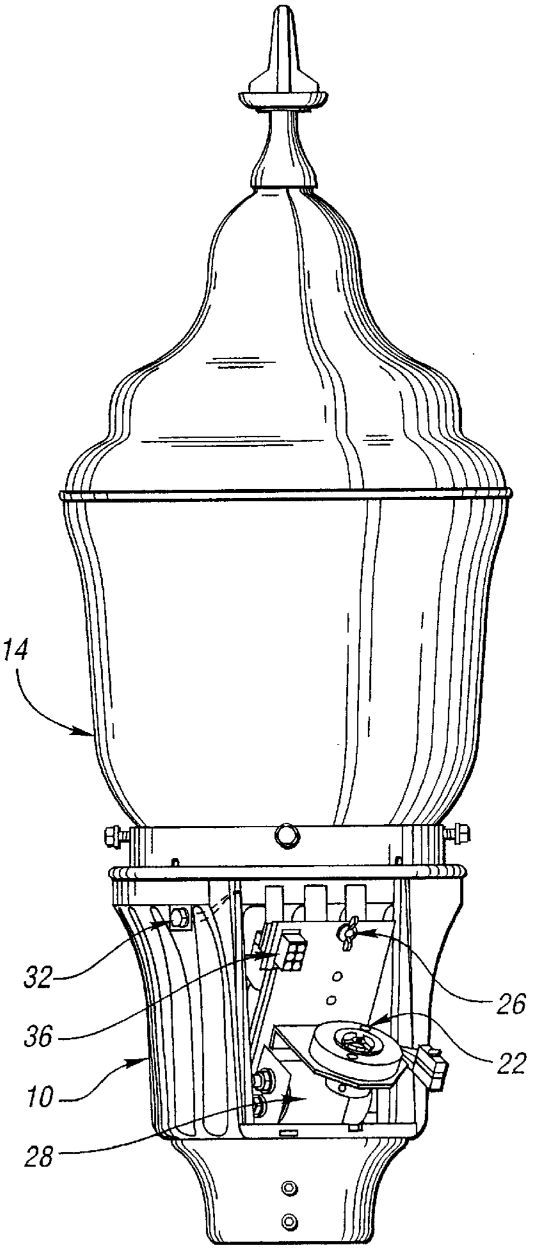
FIG. 2 is an elevational view of the ornamental street/walkway luminaire shown with the die cast access cover removed revealing the electrical component subassembly tilted out for removal.

FIG. 2 shows a view of luminaire 46 with die cast access cover 16 removed. Also shown is unitized electrical component subassembly 22 pivoted out for removal. Removal is accomplished by unplugging harness 32 and then unlocking quarter turn fastener 26 on unitized electrical component subassembly 22. By tilting the top out, subassembly 22 can be completely removed. In order to install subassembly 22, the user is merely required to insert the lower end of unitized electrical component subassembly 22 into housing 10 having the top end tilted out. Once the lower end of subassembly 22 is seated into housing 10, the upper portion may be locked into housing 10. Harness 32 is then reconnected to connector 36 on subassembly 22.

Figure 3:
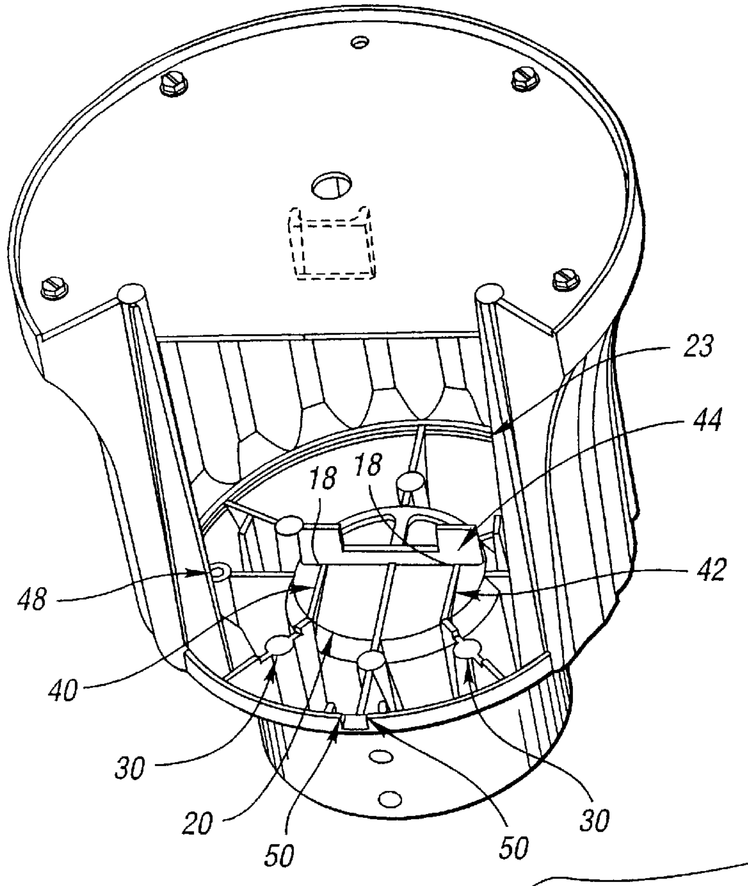
FIG. 3 is an isometric view of the housing with the unitized electrical component subassembly removed to show the area where the component subassembly rests on the housing.

FIG. 3 illustrates a view of housing 10 looking into seat area 18, right/left rails 40, 42, seat area 18, back stop 44 and pole fitter hub 20. The right rail 40 and the left rail 42 guide the unitized electrical component subassembly to the backstop 44. This drawing also illustrates safety cable boss 48 and two inclined surfaces 50. The hollow interior of the housing 10 is also integrally configured to define a cover retainer. The cover (not shown) interfits with the housing's cover retainer to close the access opening 23. The cover is releaseable from the interfit to open the access opening 23.

Figure 4:
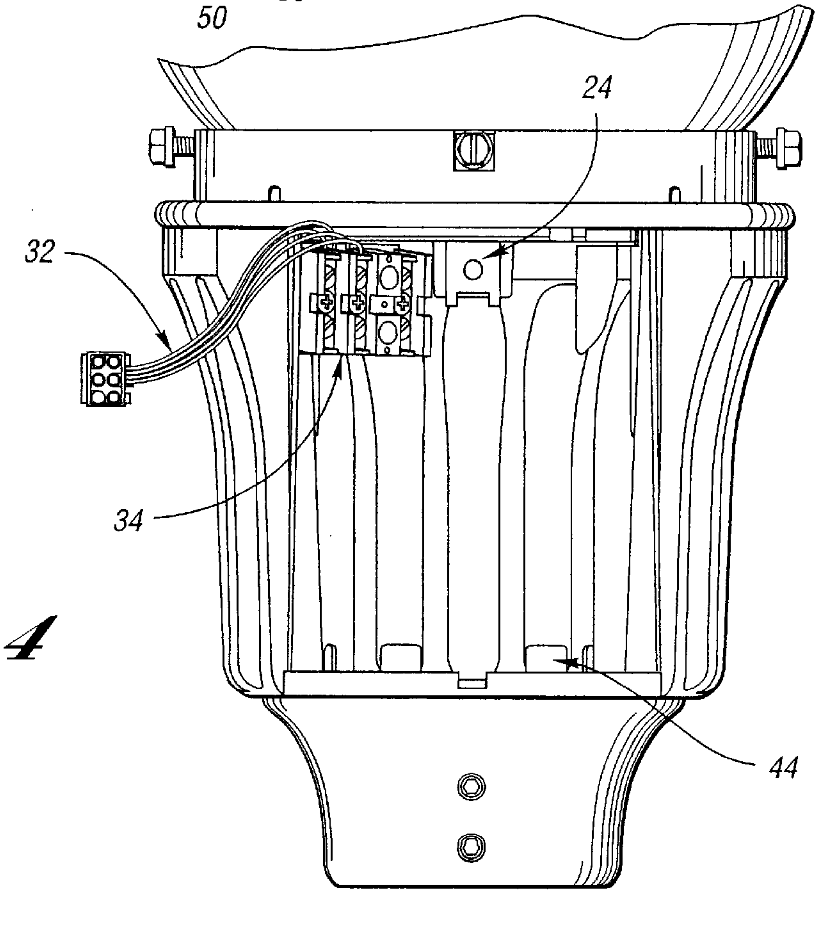
FIG. 4 is a fragmentary front elevational view of the ornamental street/walkway luminaire with the die cast access cover and unitized electrical component subassembly removed showing the terminal block, harness and the fastener keeper.

FIG. 4 shows a frontal view of the luminaire 46 with die cast access cover 16 and unitized electrical component subassembly 22 removed. Also illustrated is terminal block 34, harness 32, and quarter turn stud receptacle 24.

Figure 5:
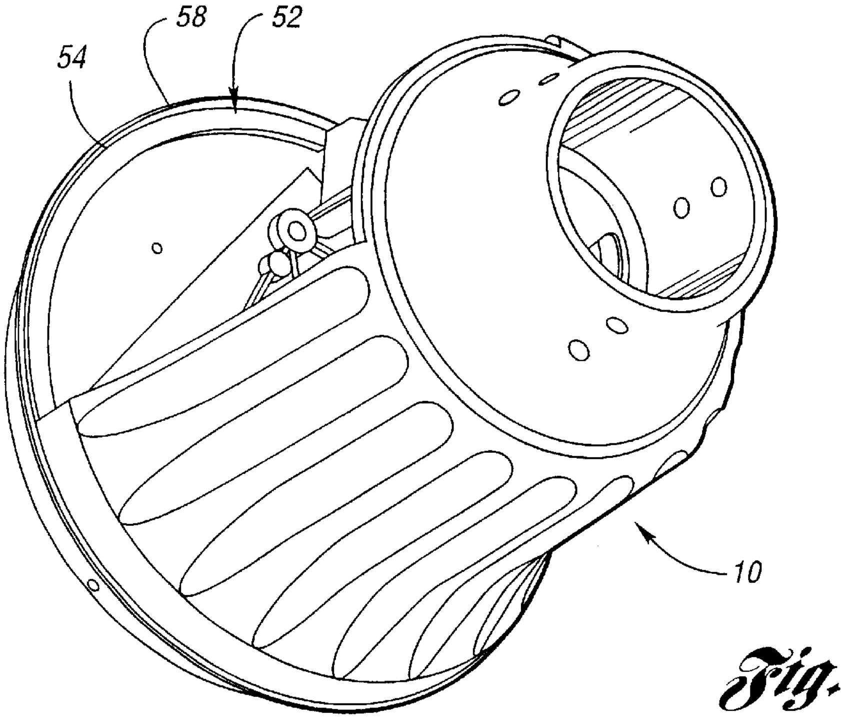
FIG. 5 is an isometric view of the housing showing the placement of the die cast access cover gasket.

FIG. 5 illustrates a view of housing 10 that affords the visibility of gasket 52 mounted to socket casting 54.

Figure 6:
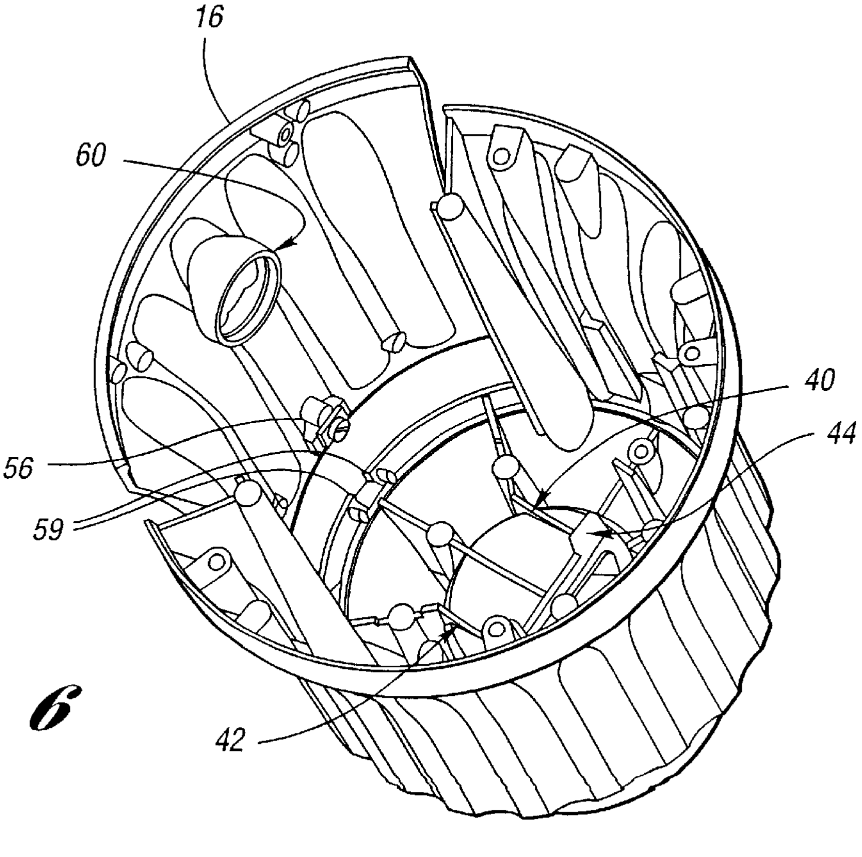
FIG. 6 is an isometric view showing how the die cast access cover engages the housing.

FIG. 6 shows a view of die cast access cover 16 fitting into housing 10. Retaining clip 56 is mounted on die cast access cover 16 and engages with clip receptacle 59 to lock die cast access cover 16 in its closed position.

Figure 7:
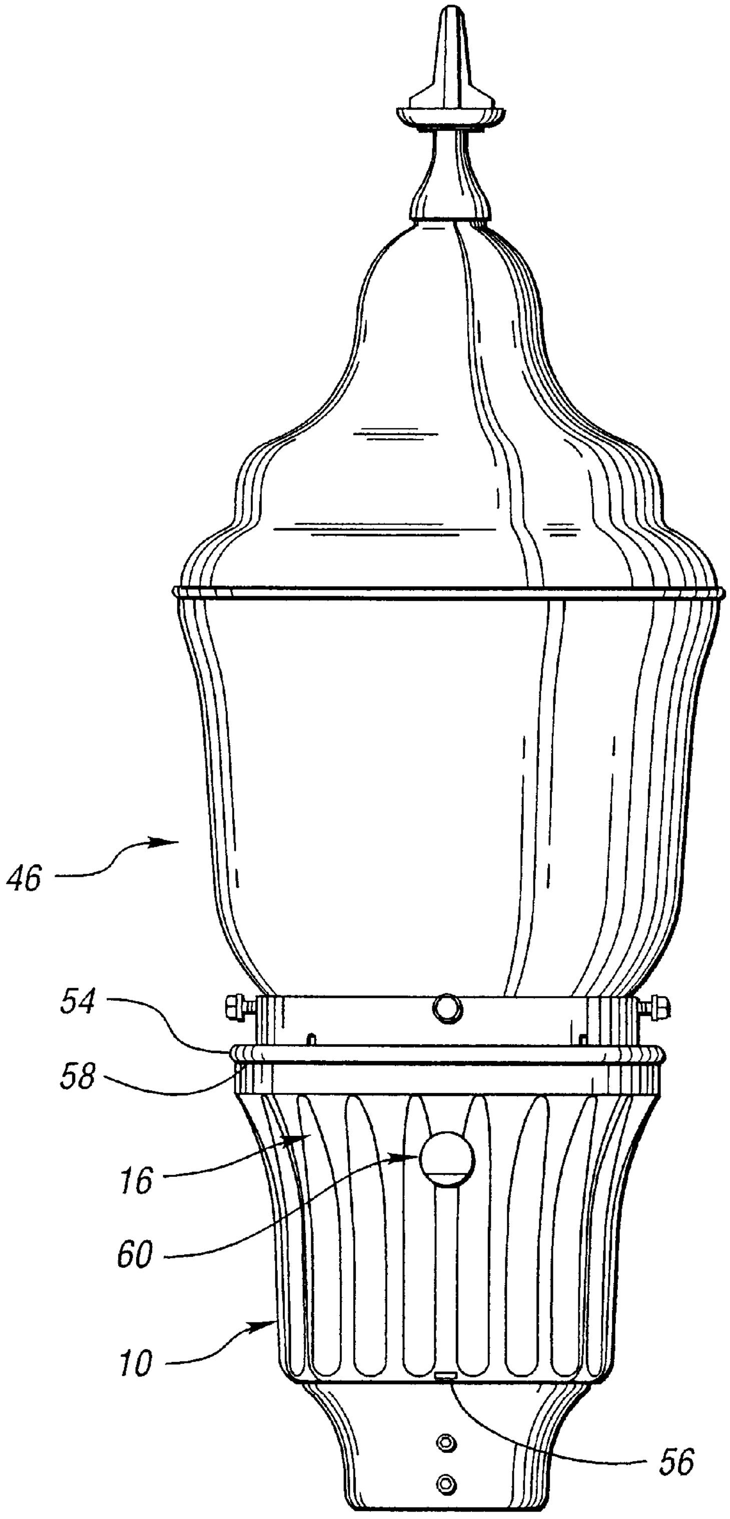
FIG. 7 is a front elevational view of the ornamental street/walkway luminaire shown with the die cast access cover in place. This access cover shows an optional photocontrol window.

FIG. 7 illustrates luminaire 46 with die cast access cover 16 in place on die cast housing 10. Access cover 16 has an optional photocontrol 60 window included. No fasteners need be removed or replaced to open or close this cover 16. Access cover 16 is held in place under rim 58 of socket casting 54 and retaining clip 56 which engages clip receptacle 59 of housing.

Figure 8:
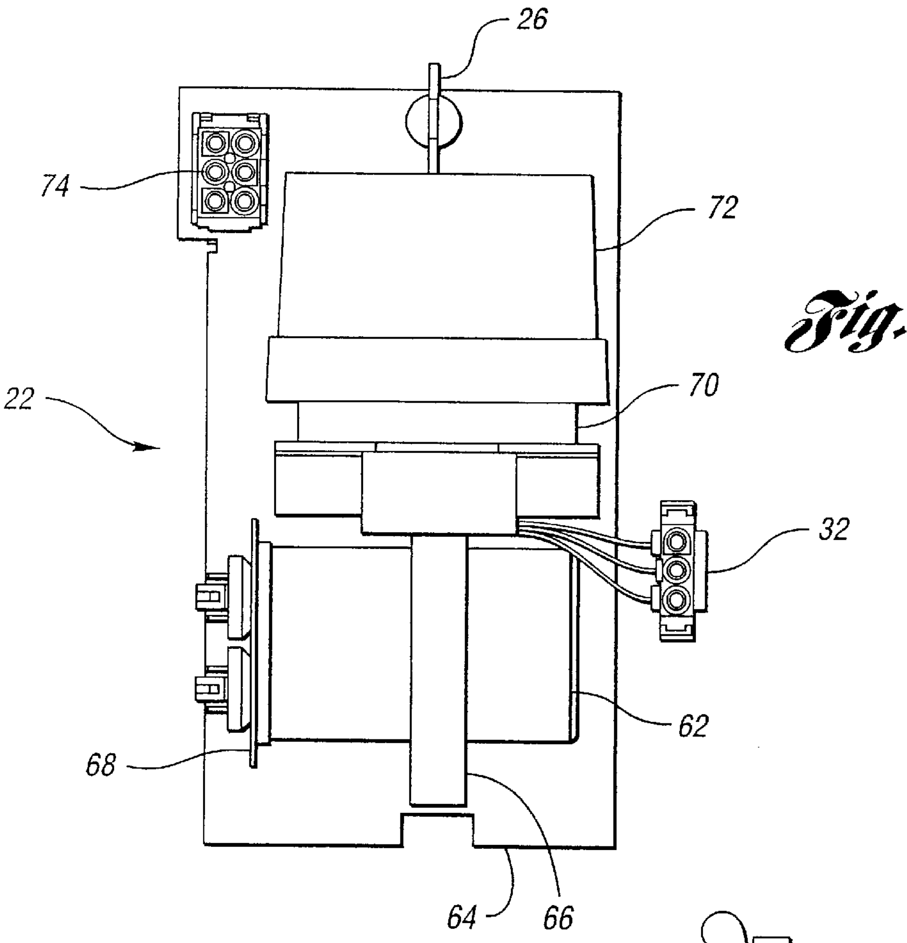
FIG. 8 is a front view of the unitized electrical component subassembly.

With reference to FIG. 8, a frontal view of the subassembly is illustrated. Capacitor 62 is mounted near the bottom of mounting plate 64 using single mounting strap 66 and anti-rotation insulator 68. Twist lock photocontrol receptacle 70 is affixed above capacitor 62. Twist lock style photocontrol 72 is attached to photocontrol receptacle 70. If the photocontrol option is not required, twist lock photocontrol receptacle 70 and twist lock photocontrol 72 are omitted from unitized electrical component subassembly 22. With respect to mounting plate 64, quarter turn stud 26 is located at the middle/top of mounting plate 64. In the upper left corner of mounting plate 64, electrical disconnect 74 is located. Electrical disconnect 74 receives line voltage and returns excitation voltage. The wiring necessary to operate the required components is self-contained on the subassembly 22. An interconnect harness 32, for ignitor (not shown) if required, originates from wiring on the subassembly 22.

Figure 9:
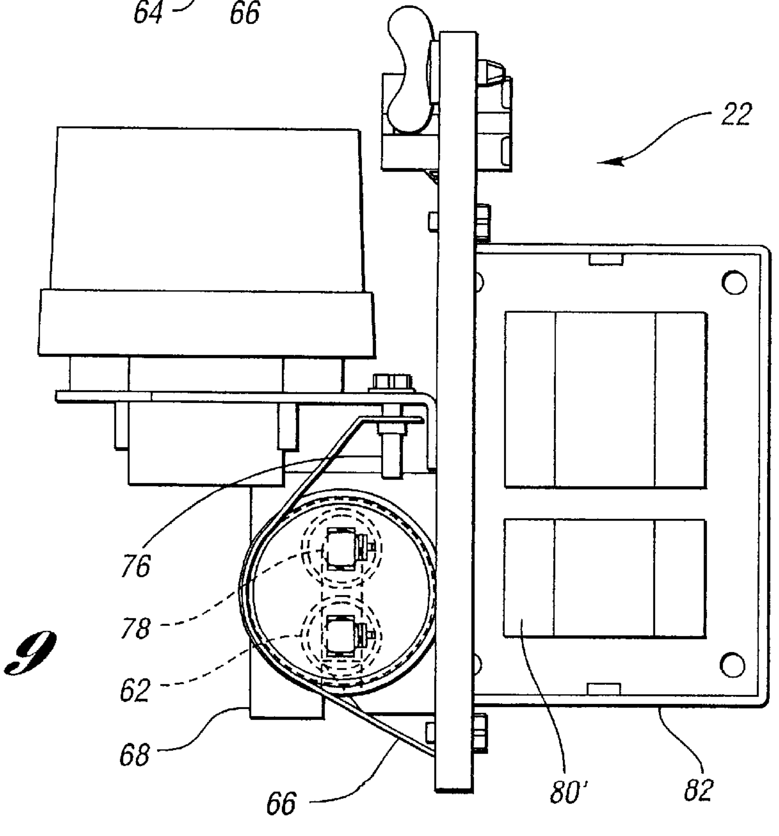
FIG. 9 is a side view of the unitized electrical component subassembly.

With reference to FIG. 9, the electrical component subassembly includes electrical components such as a ballast 80, ballast strap 82, and capacitor 62, in addition to a mounting plate 64 and a quarter-turn fastener 26. The mounting plate 64 of the electrical component subassembly 22 unitizes the electrical components and the quarter turn fastener 26. The mounting plate 64 of the electrical component subassembly cooperates with the seat of the housing to tiltably position the electrical component subassembly 22 in the hollow interior of the base or housing 10 so that the quarter turn fastener 26 aligns with the fastener keeper 24.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A luminaire comprising:

a housing having a hollow interior integrally configured to define an access opening, a seat, a fastener keeper and a cover retainer;

a cover intermitting without fasteners with the cover retainer to close the access opening and releaseable from the interfit to open the access opening, and;

an electrical component subassembly including a quarter turn fastener, and a mounting plate for unitizing the electrical components of the luminaire, the quarter turn fastener and the mounting plate of the electrical component subassembly cooperating with the seat of the housing to tiltably position the electrical component subassembly in the hollow interior of the housing so that the quarter turn fastener aligns with the fastener keeper;

whereby the electrical component subassembly is quickly and easily accessible by releasing the cover from its interfit with the housing and turning the quarter turn fastener on the mounting plate so that the electrical component subassembly is tiltably removable from the hollow interior of the housing when the mounting plate no longer cooperates with the seat of the housing.

2. The luminaire of claim 1 wherein the housing consists of a die cast material.

3. The luminaire of claim 1 wherein the cover further includes a photocontrol window.

4. A luminaire comprising:

a housing having a hollow interior integrally configured to define an access opening, a seat, a fastener keeper and a cover retainer;

a cover interfitting without fasteners with the cover retainer to close the access opening and releaseable from the interfit to open the access opening, and;

an electrical component subassembly including a ballast, capacitor, photocontrol receptacle, photocontrol, quarter turn fastener, and a mounting plate for unitizing the ballast, capacitor, photocontrol receptacle, photocontrol, and quarter turn fastener, the mounting plate of the electrical component subassembly cooperating with the seat of the housing to tiltably position the electrical component subassembly in the hollow interior of the housing so that the quarter turn fastener aligns with the fastener keeper;

whereby the electrical component subassembly is quickly and easily accessible by releasing the cover from its interfit with the housing and turning the quarter turn fastener on the mounting plate so that the electrical component subassembly is tiltably removable from the hollow interior of the housing when the mounting plate no longer cooperates with the seat of the housing.

5. The luminaire of claim 4 wherein the housing consist s of a die cast material.

6. The luminaire of claim 4 wherein the cover further includes a photocontrol window.

7. A method for quickly and easily changing electrical components for an outdoor luminaire without having to completely change the luminaire or disassemble the luminaire, the luminaire having a housing with a hollow interior integrally configured to define an access opening, a seat, a fastener keeper and a cover retainer; a cover, and an electrical component subassembly including a quarter turn fastener and a mounting plate, the method comprising:

opening the cover of the housing at the prypoint;

inserting the lower end of the electrical components subassembly in the housing wherein the top end of the electrical components is tilted out;

pivoting the top end of the electrical component subassembly into the housing; and rotating the quarter turn fastener to secure the electrical components subassembly in the housing; and snapping the cover onto the housing.

8. The method of claim 7 further comprising keeping the luminaire intact during the replacement of the electrical components subassembly.

* * * * *